July 16, 1935.  C. L. FITZ  2,008,099
PROJECTOR
Filed April 28, 1932
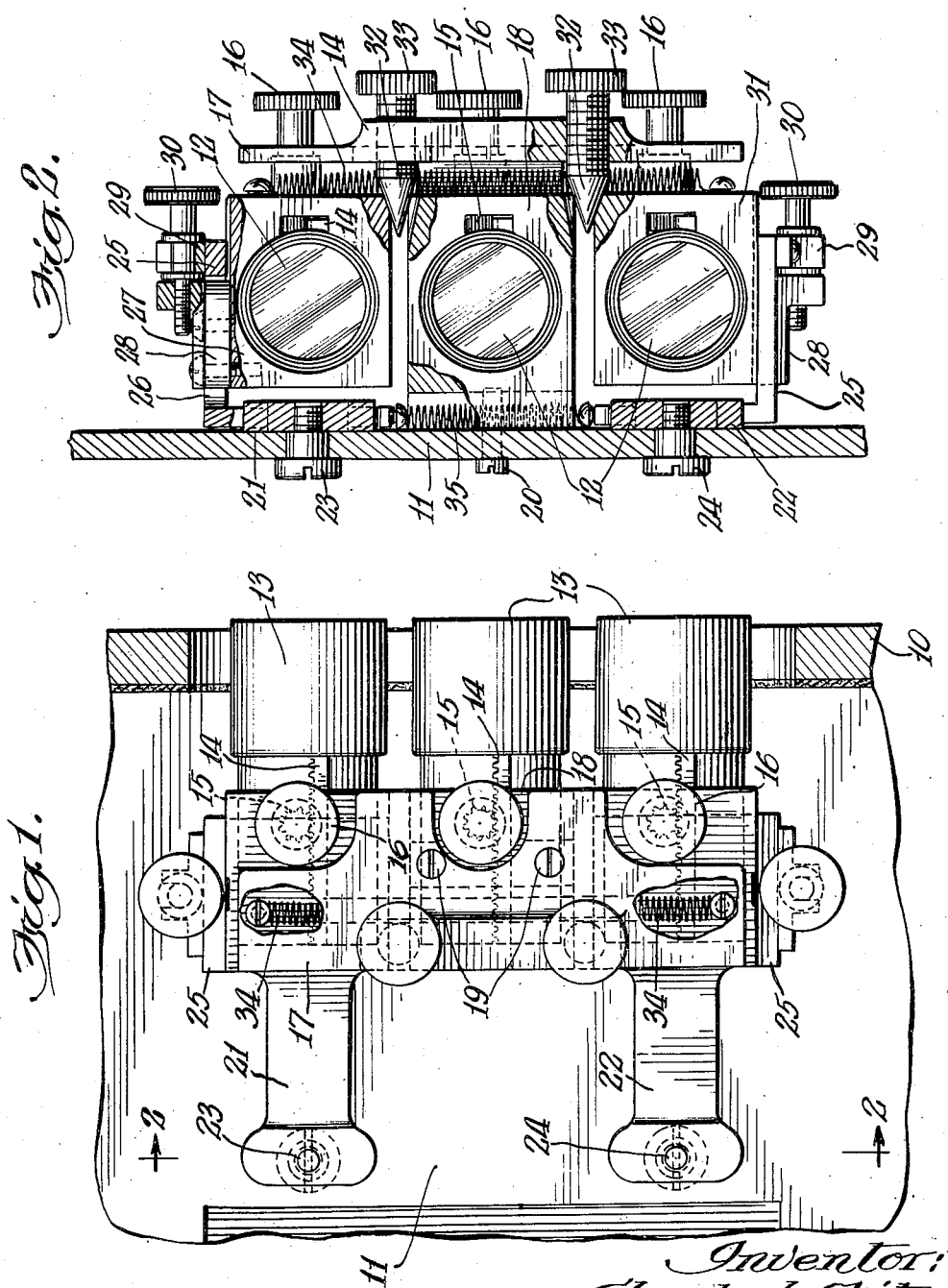

Patented July 16, 1935

2,008,099

UNITED STATES PATENT OFFICE 2,008,099

PROJECTOR

Charles L. Fitz, Chicago, Ill.

Application April 28, 1932, Serial No. 607,922

2 Claims. (Cl. 88—16.6)

My invention relates generally to picture projectors, and more particularly to still and motion picture projectors for colored pictures operating on the two-color or three-color principle.

It is an object of my invention to provide an improved multiple color picture projection apparatus having simple and effective means for registering a plurality of similar images upon the screen.

A further object is to provide an improved multi-color picture projector which is simple in construction and operation, which will be effective to reproduce pictures clearly in substantially their natural colors, and which may be economically manufactured.

Other objects will appear from the following description, reference being had to the accompanying drawing, in which:

Figure 1 is an enlarged elevational view of the lens focusing and adjusting mechanism; and Figure 2 is a vertical sectional view taken on the line 2—2 of Figure 1.

The projector is housed in a suitable portable case comprising a central housing 10. A main frame plate 11 is secured in the housing 10 and serves as a support for all of the operative parts of the projector. The projector includes film actuating means, lamps, reflectors, color screens, shutters and film guides, none of which are shown, but all of which cooperate to actuate the film intermittently and cause light to pass through the film while stationary. None of these features are shown or described as they form no part of the invention.

The light, after passing through the film, passes through suitable lenses 12 which are secured in the usual manner within lens housings 13. These housings are provided in the usual manner with longitudinally extending racks 14, which are engaged by pinions 15 carried at the end of the shafts of adjusting knobs 16. The knobs 16 are mounted for free rotation in a plate 17, which is secured to the central lens box 18 by screws 19. The lens box 18 is secured to the main frame wall 11 by a pair of cap screws 20 so as to be rigidly held thereby. A pair of lens box supporting arms 21, 22, are mounted for pivotal movement upon shouldered studs 23 and 24, respectively. These arms are provided with flanges 25, in each of which is formed an elongated slot 26. The box 27 for the upper lens housing 13 has a guide and support block 28 secured thereto. This block extends through the slot 26 and has sidewardly extending flanges overlying the flange 25, so that by means of this block the box 27 is supported for sliding movement in the slot 26. The flange 25 has an open top bearing block 29 secured thereto, and an adjusting screw 30 is mounted for free rotation in the block 29. The end of the adjusting screw 30 is threaded in the vertical extending portion of the block 28. Thus, by operation of the adjusting screw 30, the lens box may be adjusted laterally to its proper position. The lateral adjustment of the lower lens box 31 is accomplished in a similar manner. The lens boxes 27 and 31 may also be adjusted vertically. The blocks are normally held against the conical extremities 32 of adjusting screws 33 which are threaded in the plate 17 by means of springs 34 and 35. The tension spring 34 has its end secured to the lens boxes 27 and 31, respectively, while the tension spring 35 has its ends secured to the arms 21 and 22, respectively. By screwing the adjusting screws 33 inwardly, the lens box 27 will be swung upwardly about the pivot stud 23, and the lens box 31 swung downwardly about the pivot axis 24. By means of this vertical adjustment, the lenses may be positioned so as to cause exact registration of the pictures projected through each lens. This is, of course, essential to the production of a clear, sharp picture, in which the colors appear in great nicety of detail and naturalness.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. The combination with a projector of the kind described comprising a housing and a supporting frame, of a plurality of lens boxes mounted on the frame in spaced apart lateral juxtaposition, a plurality of lens carrying members one mounted in each of said boxes, means operable to move said members longitudinally in their respective boxes, means rigidly securing one of said boxes to said frame, means operable to adjust the others of said boxes transversely to maintain the optical axes of the lenses carried thereby in a common plane with the optical axis of the lens carried by said rigidly secured box, a pivotal mounting for each of said transversely adjustable boxes adapted to permit their rotation about an axis perpendicular to the common plane, resilient means tending to rotate each of said adjustable boxes in a manner to increase the angle of inclination of the optical axis of the lens carried thereby relative to the optical axis of the lens carried by said rigidly secured box, and a plurality of wedge members positioned one in each space between said boxes, said wedge members operable to control the maximum allowable inclination of the optical axes carried by the pivotally mounted boxes relative to the optical axis of the lens carried by said rigidly secured box.

2. The combination with a projector of the kind described comprising a housing and a supporting frame, of three lens boxes mounted on the frame in spaced apart lateral juxtaposition, a lens carrying member mounted in each of said boxes, means operable to move said members longitudinally in their respective boxes, means rigidly securing the middle of one of said boxes to said frame, means operable to adjust the others of said boxes transversely to maintain the optical axes of the lenses carried thereby in a common plane, means providing a pivotal mounting for each of the outer boxes adapted to permit their rotation about an axis perpendicular to said common plane, resilient means tending to rotate said outer boxes to increase the convergence of their forward ends relative to the middle box, and a pair of wedge members positioned one in each of the spaces between said boxes, said wedge members manually operable to control the maximum allowable convergence of said boxes resulting from the action of said resilient means.

CHARLES L. FITZ.